United States Patent Office

3,336,127
Patented Aug. 15, 1967

3,336,127
HIGH-ANALYSIS AMMONIUM POLYPHOSPHATE FERTILIZER
Travis P. Hignett, Sheffield, and John G. Getsinger, Florence, Ala., assignors to Tennessee Valley Authority, a corporation of the United States
Filed Feb. 28, 1966, Ser. No. 530,287
1 Claim. (Cl. 71—51)

The invention herein described may be manufactured and used by or for the Government for governmental purposes without the payment to us of any royalty therefor.

This application is a continuation-in-part of our copending application Ser. No. 429,687, filed Feb. 1, 1965, now U.S. Patent 3,264,085, which copending application in turn is a continuation-in-part of application Ser. No. 227,664, filed Sept. 27, 1962, now U.S. Patent 3,228,752, which in turn is a division of application Ser. No. 136,960, filed Sept. 8, 1961, now U.S. Patent 3,171,733, all of said applications filed for "High-Analysis Ammonium Polyphosphate Fertilizer."

Our invention relates to a new high-analysis solid fertilizer material suitable for preparing high-analysis liquid mixed fertilizers, and more particularly to a solid fertilizer material produced by reacting anhydrous ammonia and highly concentrated phosphoric acid.

Hertofore, liquid mixed fertilizers having compositions similar to those of standard dry mixed fertilizers have been well known, and such fertilizers are increasing in popularity in the industry. Such solutions have numerous advantages over dry mixed fertilizers in that the costs of evaporating moisture and bagging the product are eliminated. Such liquid fertilizers greatly simplify the operation of applying plant nutrients to the soil.

However, liquid fertilizers have in the past had some outstanding disadvantages. Raw - material costs have proved to be relatively high, and the solutions produced have been so corrosive as to result in high maintenance and storage costs. The liquid fertilizer solutions produced by the prior-art methods also have been limited to a maximum content of plant food of about 33 weight percent. This upper limit of available plant nutrients in prior-art solutions results from the fact that solutions having concentrations in excess of this amount always have been found to crystallize and precipitate salts out of solution when stored at or below room temperature.

A recent breakthrough in the above-mentioned maximum content of plant-food units in liquid mixed fertilizers is shown in U.S. Letters Patent 2,950,961, Marcus M. Striplin, Jr., et al., assigned to the assignee of the present invention. Striplin teaches the production of liquid mixed fertilizers which ordinarily contain as much as 60 weight percent plant food. Thus, unusually high percent of plant-food content is obtained in his process by ammoniating superphosphoric acid under controlled conditions. Superphosphoric acid, a concentrated phosphoric acid having generally from about 72 percent to about 85 percent $P_2O_5$ content, is rapidly becoming a popular raw material in the fertilizer industry for the production of liquid fertilizers.

The term "superphosphoric acid" used in this specification and claims is defined as a phosphoric acid containing substantial quantities of both ortho- and polyphosphoric acids. These polyphosphoric acids include pyrophosphoric acid and other polymers from the tri- to the nonapolymer and higher. The proportions of polyphosphoric acids vary with the $P_2O_5$ content of the superphosphoric acid. The Canadian Journal of Chemistry, vol. 34 (1956), page 790, shows that superphosphoric acid in the range from 69.81 to 84.95 percent $P_2O_5$ contains the following proportions of orthophosphoric acid and polyphosphoric acid, expressed as percent of total phosphorus.

97.85 to 2.32 percent ortho-
2.15 to 49.30 percent pyro-
0.00 to 24.98 percent tri-
0.00 to 16.99 percent tetra-
0.00 to 12.64 percent penta-
0.00 to 9.75 percent hexa-
0.00 to 8.62 percent hepta-
0.00 to 7.85 percent octa-
0.00 to 6.03 percent nona-
0.00 to 29.41 percent higher polymers Alternatively, if wet-process phosphoric acid is concentrated from the usual maximum of about 54 percent $P_2O_5$ up to the range of about 65 to 76 percent $P_2O_5$ by a process such as shown in a copending application of John G. Getsinger, Ser. No. 835,377, filed Aug. 21, 1959, and assigned to the assignee of the present invention, the distribution of ortho-, pyro-, and higher polymers of the polyphosphoric acids will be somewhat dissimilar to that shown in the above-mentioned Canadian Journal of Chemistry. The presence of the impurities in such concentrated wet-process phosphoric acid, and the $H_2O:P_2O_5$ ratio in acid so concentrated is believed to somewhat alter the distribution of the various polymers in this system.

The term "superphosphoric acid" has become widely accepted in the industry during the past several years and it, or its analogy, polyphosphoric acid, is a generic term used to define the phosphoric acids having less water of constitution that orthophosphoric acid. Whereas, orthophosphoric acid contains one atom of phosphorus per molecule and has a theoretical mol ratio of water to phosphorus pentoxide of 3.0 or greater, the polyphosphoric acids have two or more atoms of phosphorus in a chain or ring structure in alternating sequence with oxygen, and a theoretical mol ratio of water to phosphorus pentoxide less than 3. Polyphosphoric acid has two general forms, the acyclic and the cyclic, commonly called metaphosphoric acid. In the acyclic form, which is derived by limited molecular dehydration of orthophosphoric acid, the individual chains of phosphorus and oxygen atoms have terminal ends and a theoretical mol ratio of water to phosphorus pentoxide between 2 and 3. In metaphosphoric acid, which is derived from the acyclic form by continued molecular dehydration, the chain is endless, forming ring structures. Metaphosphoric acids have theoretical mol ratios of water to phosphorus pentoxide of 2 or less. In practicing our invention, the acyclic species is formed by concentration of the ortho form; however, the concentration or dehydration of the acid is stopped before the meta species is formed, since not only is this species ineffective in preventing the formation of precipitates in neutral salt solutions, but metaphosphoric acid form salts with the metal impurities which are also insoluble in the acid.

The empirical formula for the desired acyclic polyphosphoric acid is:

$$H_{n+2}P_nO_{3n+1}$$

where:

H represents hydrogen.
P represents phosphorus
O represents oxygen, and $n$ is greater than 1.
When $n=2$, the species is commonly known as pyrophosphoric acid; when $n=3$, the species is tripolyphosphoric acid.

Prior-art processes and methods for the production of concentrated fertilizers have proved to be operative; however, the industry has long felt the need for a high-analysis solid fertilizer material which may be processed without the undesirable step of evaporating moisture therefrom. In addition, the industry has desired a material which may either be directly applied to the soil or more preferably be readily soluble in water for effecting the production of relatively high-analysis liquid fertilizers just prior to application to the soil. The desirability of having a high-analysis solid material which is readily soluble in water for the production of liquid fertilizers is evidenced in the prior art in efforts to dissolve diammonium phosphate in aqueous media for the production of liquid fertilizers. Liquid fertilizers so produced are limited to a maximum grade of about 8–24–0, whereas we have found that by dissolving the product of our invention we obtain a liquid fertilizer of grade 11–33–0 and higher.

Our invention is directed to a new composition of matter which is readily soluble in water and extremely useful as a starting material for the production of high-analysis liquid fertilizers.

We have overcome the disadvantages inherent in both liquid mixed and dry granular fertilizers of the type shown in the prior art to a substantial extent in the present invention by providing a composition of matter which contains up to 80 percent of its weight in the form of available plant food, and which is produced by a process of directly reacting anhydrous ammonia with concentrated phosphoric acid at elevated temperatures and pressures. Furthermore, several new, advantageous features over conventional dry mixed or liquid mixed fertilizer materials are realized by the present invention.

Among these advantages are convenience in the preparation of high-analysis liquid mixtures at or near the point of application to the soil and the sequestration of impurities in wet-process phosphoric acid. The composition of our invention has been found to have sequestration properties equal to those of superphosphoric acid and the 11–33–0 solution described in the above-mentioned Striplin et al. patent. In addition, the composition of our invention has advantages over the liquid mixed fertilizers mentioned above in economy and convenience of transportation and storage. Transportation of liquid fertilizers has been handicapped by lack of transportation equipment. The expense of storing liquid fertilizers also has prevented many manufacturers from obtaining their supply before the peak season. During the peak season, there are not enough tank cars or trucks available to transport liquid material. In addition, there exists the possibility of crystallization of stored superphosphoric acid and liquid mixed fertilizers in extremely cold weather.

The composition of our invention is free from these disadvantages, since it can be shipped in readily available boxcars and stored in open bins and it is unaffected by cold weather. Finally the material of our invention is extremely water soluble.

As an illustration of the above-mentioned advantageous shipping economy of material of our invention, it has been calculated that the freight on 1 ton of plant food in the form of an 11–33–0 solution of the type mentioned in the Striplin et al. patent from Sheffield, Ala., to Auburn, Wash., is about $65. However, the freight on 1 ton of plant food between the same two points in the form of the composition of our invention is only about $35.

It is therefore an object of the present invention to provide a new solid composition of matter and a process for its production, which composition contains unusually high amounts of available plant food.

Another object of the present invention is to provide a new solid composition of matter and a process for its production, which composition contains unusually high amounts of available plant foods and is readily soluble in water.

Still another object of the present invention is to provide a new solid composition of matter and a process for its production, which composition contains unusually high amounts of available plant food, which is readily soluble in water, and which may be either directly applied to the soil in dry form or dissolved in an aqueous medium for preparation of high-analysis liquid fertilizers.

A further object of the present invention is to provide a new solid composition of matter and a process for its production, which composition contains unusually high amounts of available plant food, which is readily soluble in water, which may be either directly applied to the soil in dry form or dissolved in aqueous medium for preparation of high-analysis liquid fertilizers, and which is easily prepared from readily available raw materials.

In carrying out the objects of our invention in one form thereof we employ a reactor vessel, a stirring means, and other equipment. Our reactor vessel and associated equipment incorporate a pressure system which is operated at pressures and temperatures substantially above atmospheric. We have found it most economical to employ this type of equipment for both batch- and continuous-mixing operations. Our invention, together with further objects and advantages thereof, will be better understood from a consideration of the following description, taken in connection with the accompanying drawings in which:

Figure 1:
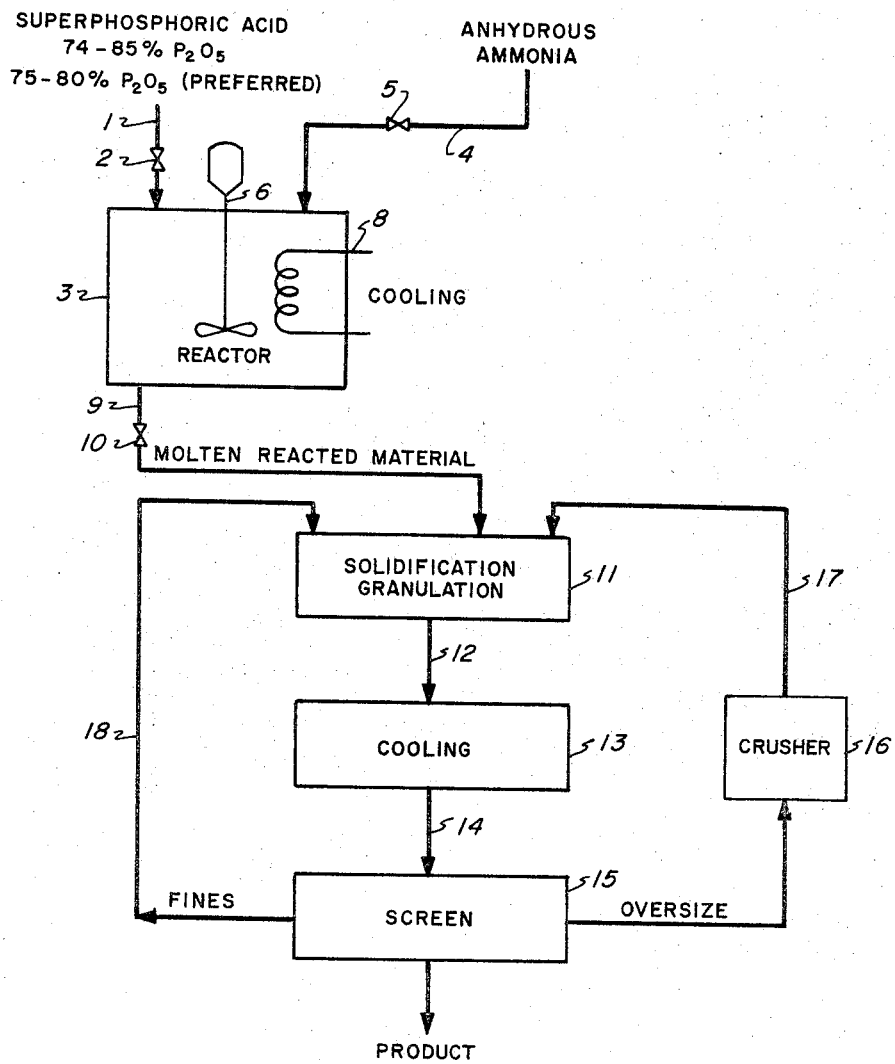
FIGURE 1 is a flowsheet illustrating principles of our process which results in a solid fertilizer having the novel properties mentioned above.
Figure 3:
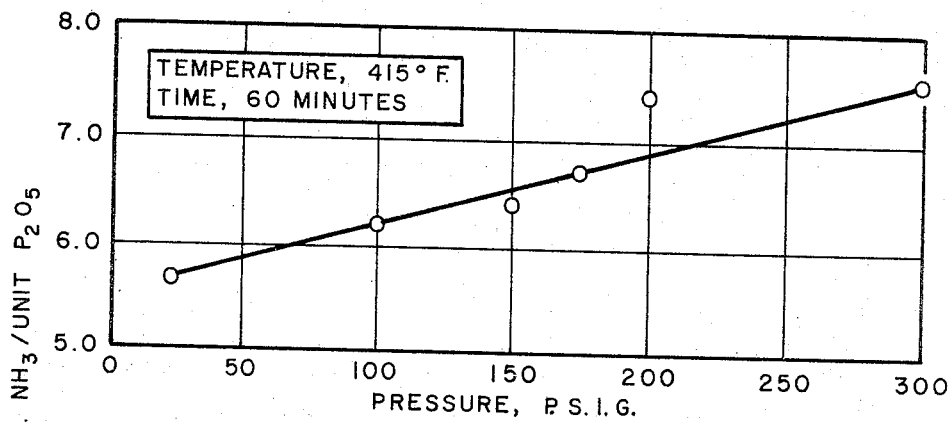
FIGURE 3 is a graphical illustration showing the effect of pressure on the degree of ammoniation of ammonium polyphosphate.
Figure 2:
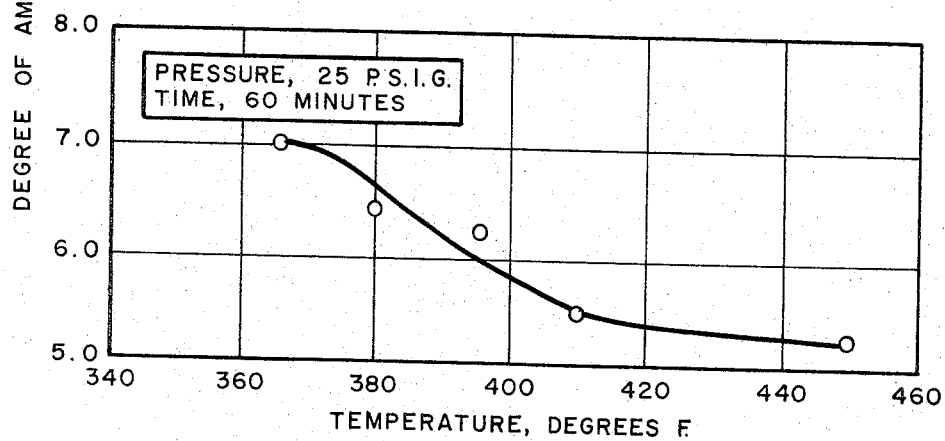
FIGURE 2 is a graphical illustration showing the effect of reaction temperature on the degree of ammoniation of ammonium polyphosphate.

Referring now more specifically to FIGURE 1, superphosphoric acid from a source not shown is fed through line 1 and any suitable means for controlling the rate of flow 2 into a reaction zone comprising vessel 3. Anhydrous ammonia from a source not shown is fed into vessel 3 through line 4 and means 5 for controlling the rate of flow. Vessel 3 is equipped with a motor-driven agitator 6 running at such speed as to secure rapid and intimate mixing of acid and anhydrous ammonia to keep the resulting mixture in vigorous agitation until reaction is complete. Cooling coils 8 are located within vessel 3 and may be disposed in a baffle-like arrangement to increase the degree of agitation resulting from the action of agitator 6. We prefer to introduce a stream of superphosphoric acid at a steady rate of flow according to the capacity of the equipment and to vary the rate of introduction of anhydrous ammonia as may be necessary to maintain the desired pressure of excess ammonia in the reactor.

The product is discharged from reactor vessel 3 through line 9 and any suitable means for controlling the rate of flow 10 as a melt which solidifies upon subsequent cooling. The molten material from reactor vessel 3 is discharged into solidifier and granulator 11, where it is subjected to agitation by stirring means not shown. It has been found that agitation in vessel 11 is required to cause the molten material to set up into hard granules. The resulting hard granules are fed through line 12 into cooling means 13, which may comprise a rotary cooler or other conventional cooling equipment. The cooled, hard granular material travels from cooling means 13 via line 14 to a screening means generally illustrated as screens 15 and crusher 16. The crushed oversize material and the fine material are returned to granulator 11 via lines 17 and 18, respectively.

The acid fed to reactor vessel 3 may be either electric-furnace acid or concentrated wet-process acid. If electric-furnace acid is used, the concentration of $P_2O_5$ should be about 74 to 85 percent; however, products with superior physical properties are made when using acid containing 75 to 80 percent $P_2O_5$. Wet-process phosphoric acid can be used in this process in either batch-type or continuous-type operation. The desired concentration of the wet-process phosphoric acid will vary, depending upon the impurities present therein. When wet-process phosphoric acid is used, it is preferred that the acid contain about 65 to 75 percent $P_2O_5$. The pressure maintained in reactor vessel 3 may be in the range from about 10 up to about 1000 pounds per square inch, depending upon other variables present in the process. However, the preferred operating pressure range has been determined to be about 10 to 100 p.s.i.g. Increasing the pressure increases the degree of ammoniation, and the use of pressure in reactor 3 obviates any necessity for a scrubber or other means for controlling loss of ammonia.

In another embodiment of our invention, the use of pressure makes possible the use of automatic control of the feed rate of the ammonia to reactor 3. This is accomplished by using an automatic pressure-regulating valve in the ammonia feed line to control the pressure in the reactor. The flow of ammonia to reactor 3 will then automatically be equal to the amount that can be reacted under the conditions of operation.

The temperature in reactor 3 may be maintained in the range from about 325° F. to 475° F., with the preferred temperature range being about 350° F. to 385° F. Depending upon temperature and other variables, the retention time of the material in reactor vessel 3 may range from about 10 minutes to 3 hours, the preferred retention time being in the range of about 1 to 1.5 hours. We have found that increasing the retention time increases the degree of ammoniation of the product.

Motor-driven agitator 6 provides vigorous agitation in reactor vessel 3 and is required in order to effect intimate mixing of the anhydrous ammonia with the liquid ammonium polyphosphate in reactor 3. The intimate mixing so produced by agitator 6 has been found to increase the rate of reaction in vessel 3 and therefor the degree of ammoniation within a given retention time.

The hard granular product of our invention is, for the sake of convenience, hereinafter referred to as ammonium polyphosphate. In our earliest work we noted that microscopic and chemical examinations of the products *as produced* from various tests using 76 percent phosphoric acid indicated that the product initially contained about 50 to 60 percent ammonium orthophosphate and about 38 to 46 percent ammonium pyrophosphate and from about 2 to 3 percent of acyclic ammonium phosphates more highly condensed than the ammonium pyrophosphate and said more highly condensed phosphates consisting of an amorphous gel such that the identification of this minute constituent by microscopic or X-ray methods was not possible. In work subsequent thereto we later reported that we also found that the ammonium polyphosphate material of our invention, when made with superphosphoric acid in the relatively narrow range of 78 to 80 percent $P_2O_5$, contained a pyrophosphate content which was surprisingly high and indicated that a shift toward the pyrophosphate took place during ammoniation of the acid. In addition, we also found and reported that, when the superphosphoric acid used contained more than about 80 percent $P_2O_5$, this shift to the high pyrophosphate content was not in evidence.

We have now found that the ammonium polyphosphate product of our invention is not at equilibrium when the material is first produced, but rather that certain alterations in the ammonium polyphosphates occur, and further that the analysis of the material after these alterations have occurred is dependent in part upon the degree of ammoniation of the acid in the pressure reactor, i.e., the pounds of ammonia reacted per unit of $P_2O_5$. As we reported earlier, the product of our invention, as first produced and before equilibrium conditions exist, contains quantities of ammonium orthophosphate and ammonium pyrophosphate, together with a very small percentage of amorphous or gel-like higher polymers of the polyphosphates. We have now found that the product of our invention, after it has reached equilibrium conditions, contains orthophosphates and pyrophosphates from the group comprising monoammonium orthophosphate, diammonium orthophosphate, triammonium pyrophosphate, tetraammonium pyrophosphate, and mixtures thereof. In addition, the minute quantities of gel-like phase are not in evidence in our product after it has reached conditions of equilibrium.

We have also found that, after the material has reached equilibrium conditions and after it has been stored under conditions wherein it is exposed to atmospheric water, the product may also contain, in addition to the four constituents enumerated supra, at least two of these salts in their hydrated states. These salts in the hydrated states are diammonium pyrophosphate and triammonium pyrophosphate monohydrate. If they are present they occur in the product only as a consequence of subsequent exposure of the initial combination (i.e., monoammonium orthophosphate, diammonium orthophosphate, triammonium pyrophosphate, tetraammonium pyrophosphate, and mixtures thereof) to moisture and thermal stress. The initial combination, however (i.e., monoammonium orthophosphate, diammonium orthophosphate, triammonium pyrophosphate, tetraammonium pyrophosphate, and mixtures thereof), will be the equilibrated mixtures of the ammonium polyphosphate melt with which the present invention is concerned.

These latter two species, i.e., the hydrated salts, since they do not represent the initial product after equilibrium has been attained, are to be construed in the nature of artifacts and have been excluded in the ensuing calculations which apply strictly to the initial products, monoammonium orthophosphate, diammonium orthophosphate, triammonium pyrophosphate, tetraammonium pyrophosphate, and mixtures thereof, at equilibrium at which time the chemical constituents of the gel phase originally present in the melt have largely reorganized in discrete crystalline compounds whose identities can be and are readily established. In other words, the composition with which the present invention is concerned is neither the originally produced melt containing the gel-like phase, at which time said melt has not attained equilibrium, nor is the present invention concerned with the equilibrated melt which has been subsequently exposed to moisture and/or thermal stress. Rather, the instant invention is concerned only with the melt after the constituents therein have attained a state of equilibrium and from which the constituents originally in the gel phase have been reorganized into discrete crystalline compounds. Under truly static conditions wherein the melt is not disturbed, the time to reach such an equilibrium may take several months and, under some conditions, upwards to as much as a year. We have found, however, that we can greatly shorten the time required for equilibrium to be attained by applying mechanical energy to the melt in the form of agitation. Under conditions of mild agitation, such equilibrium may be attained in perhaps one or two hours. From a practical standpoint and in the preferred embodiment of our invention, however, we have found that we can attain essentially complete equilibrium in as little as 5 or 10 minutes by applying substantial quantities of mechanical energy to the melt in the form of harsh agitation. Alternatively, by increasing the rate of recycle such that the recycle particles are coated with a thin film of the melt, the resulting shear energy imparted thereto also reduces the time necessary for attaining equilibrium down to the more practical period of a few minutes. In addition, the degree of ammoniation may be a factor in that if less than the amount shown in our disclosure is employed, the time necessary for attaining equilibrium may be increased significantly. The qualitative and somewhat quantitative relationship of these materials to one another are illustrated in Table I below, it being understood that in those compounds wherein there is reported the salts of our composition in the hydrated states that said samples were subsequently, after equilibrium conditions were obtained, exposed to moisture and/or thermal stress.

TABLE I.—ALTERATIONS IN AMMONIUM POLYPHOSPHATES DURING OPEN STORAGE FOR 1 MONTH

| No. | Composition, percent | | | Lb. NH$_3$/ unit P$_2$O$_5$ | Mineralogical composition [a] | | | | | | | |
|---|---|---|---|---|---|---|---|---|---|---|---|---|
| | P$_2$O$_5$ | | N | | Original | | | | | Stored | | |
| | Total | Ortho | | | N$_4$P$_2$ | N$_3$P$_2$ | N$_3$P$_2$·H$_2$O | N$_2$P | NP | N$_3$P$_2$·H$_2$O | N$_2$P$_2$ | NP |
| Run 45 | 61.5 | 31.3 | 14.6 | 5.8 | | XX | | | XX | | XX | XX |
| CR-403 | 60.9 | 26.9 | 14.8 | 5.9 | | XX | | | XX | X | XX | XX |
| SAP-50 | 62.2 | 26.6 | 15.2 | 5.9 | | XX | X | | XX | XX | XX | XX |
| Run 73 | 61.3 | 34.6 | 15.4 | 6.1 | | XX | | X | XX | XX | XX | XX |
| Run 37-OP | 60.0 | 27.0 | 16.7 | 6.8 | | X | XX | X | XX | XX | X | XX |
| RPSAP-20-AS | 57.1 | 33.1 | 19.9 | 8.5 | | XX | | XX | | XX | | XX |
| R29-AS | 55.1 | 32.9 | 21.5 | 9.5 | XX | | | XX | | XX | | XX |

[a] Determined from X-ray intensity data. N$_4$P$_2$=(NH$_4$)$_4$P$_2$O$_7$, N$_3$P$_2$=(NH$_4$)$_3$HP$_2$O$_7$, N$_3$P$_2$·H$_2$O=(NH$_4$)$_3$HP$_2$O$_7$·H$_2$O, N$_2$P$_2$=(NH$_4$)$_2$H$_2$P$_2$O$_7$, N$_2$P=(NH$_4$)HPO$_4$, NP=NH$_4$H$_2$PO$_4$. XX=major phase, X=secondary phase.

As is shown in Table I above, the various constituents and their semiquantitative proportions may be determined by X-ray. We now have determined that, in addition, we can show a theoretical mathematical bridge between the left hand side of Table I above and the right hand side of Table I above through the use of matrix algebra, taking into consideration the established stoichiometry of the component salts. For reference, the stoichiometry of the component salts such as the triammonium pyrophosphate and tetraammonium pyrophosphate may be found in the Journal of Agricultural and Food Chemistry, vol. 13, July/August 1965, pages 316–322. Following therefore is the general solution which will allow those skilled in the art having such analytical data as found in the left hand portion of the table to mathematically predict the occurrence of the constituents illustrated in the right hand portion of said table.

*General solution of composition*

Given:
Total nitrogen (wt. percent N)=N$_t$
Total phosphorus (wt. percent P$_2$O$_5$)=P$_t$
Non-ortho phosphorus (wt. percent P$_2$O$_5$)=P$_{no}$
Ortho-P$_2$O$_5$=(P$_t$−P$_{no}$)=P$_o$
H$_2$O=[100−(1.85 N$_t$+P$_t$)]=H$_2$O$_t$ Components:[1]
$NH_4H_2PO_4 = W$
$(NH_4)_2HPO_4 = X$
$(NH_4)_3HP_2O_7 = Y$
$(NH_4)_4P_2O_7 = Z$

*Equations for solving weight fractions of W, X, Y, and Z*

(I)   $N_t = 0.122W + 0.212X + 0.183Y + 0.228Z$ [2]
(II)  $P_o = 0.615W + 0.535X + (0)Y + (0)Z$ [3]
(III) $P_{no} = (0)W + (0)X + 0.62Y + 0.577Z$ [3]
(IV)  $H_2O_t = 0.156W + 0.068X + 0.039Y + (0)Z$ [4]

[1] Determined by X-ray.
[2] Coefficients=wt. percent nitrogen in indicated solid phase.
[3] Coefficients=wt. percent P$_2$O$_5$ in indicated solid phase.
[4] Coefficients=wt. percent H$_2$O in indicated solid phase.

Rearrange order to IV–II–III–I.

*General form of solution of 4 non-symmetrical equations*

$$\begin{bmatrix} 0.156W + 0.068X + 0.039Y + 0 \\ 0.615W + 0.535X + 0 + 0 \\ 0 + 0 + 0.62Y + 0.577Z \\ 0.122W + 0.212X + 0.183Y + 0.228Z \end{bmatrix}^{-1} \begin{bmatrix} H_2O_t \\ P_o \\ P_{no} \\ N_t \end{bmatrix} = \begin{bmatrix} W \\ X \\ Y \\ Z \end{bmatrix}$$

The above general formula of solution of the 4 non-symmetrical equations is not presented in the strict graphic matrix notation in that the plus signs and W, X, Y, and Z notations could be construed to represent redundancy in that obviously these symbols are implied in the strict matrix notation. However, the intent of this redundancy is to illustrate to the reader the transition steps by which the set of nonsymmetrical equations are to be reorganized in a form amenable for solution by matrix algebra, which in the strict graphical matrix notation is as follows:

$$\begin{bmatrix} .156 & .068 & .039 & 0 \\ .615 & .535 & 0 & 0 \\ 0 & 0 & .62 & .577 \\ .122 & .212 & .183 & .228 \end{bmatrix}^{-1} \begin{bmatrix} H_2O_t \\ P_o \\ P_{no} \\ N_t \end{bmatrix} = \begin{bmatrix} W \\ X \\ Y \\ Z \end{bmatrix}$$

The coefficients of the items W, X, Y, and Z above in said matrix array correspond to the weight fraction of the indicated component in the respective salt and are derived from the now known stoichiometry of the individual salt. (See again the Journal of Agricultural and Food Chemistry.)

We have found that it is necessary to further refine the general form of the solution above in order to more accurately predict and calculate the composition of our product. Following therefore is the more refined and finalized matrix array which theoretically and accurately defines the product of our invention.

$$\begin{bmatrix} 0.15662 & 0.06821 & 0.03932 & 0 \\ 0.61701 & 0.53743 & 0 & 0 \\ 0 & 0 & 0.61965 & 0.57677 \\ 0.12178 & 0.21214 & 0.18345 & 0.22767 \end{bmatrix}^{-1} \begin{bmatrix} H_2O_t \\ P_o \\ P_{no} \\ N_t \end{bmatrix} = \begin{bmatrix} W \\ X \\ Y \\ Z \end{bmatrix}$$

Again the procedure for inverting an algebraic matrix is also well set forth in recognized mathematical text; however, for the sake of clarity and convenience to the reader the inverse of the 4 x 4 matrix A is as follows:

$$\begin{bmatrix} 253537.57239881 & -96534.462430689 & -64356.132494076 & 163037.23169040 \\ -291080.17331707 & 110830.67313764 & 73885.673130528 & -187178.98577544 \\ -504920.54850318 & 192255.01757824 & 128171.81350668 & -324705.30538169 \\ 542458.89675260 & -206548.22831000 & -137699.02082185 & 348845.54064838 \end{bmatrix}$$

The following Table II illustrates the results of three tests wherein the analytical data was fed into our general solution within the limits of ammoniation of the acid used to produce our product, i.e., in test 1 from X-ray data we first predicted that the material contained approximately a mixture of 50 percent monoammonium orthophosphate and triammonium pyrophosphate. In test 2 the X-ray data indicated that the material was a mixture of approximately equal parts of all four constituents, i.e., monoammonium orthophosphate, diammonium orthophosphate, triammonium pyrophosphate, and tetraammonium pyrophosphate. In test 3 the X-ray data indicated that the material contained a 50–50 mixture of diammonium orthophosphate and tetraammonium pyrophosphate.

TABLE II

| | Test No. 1 | Test No. 2 | Test No. 3 |
|---|---|---|---|
| Data: | | | |
| H$_2$O$_t$ | 9.80 | 6.60 | 3.41 |
| P$_o$ | 30.85 | 28.86 | 26.87 |
| P$_{no}$ | 30.98 | 29.91 | 28.84 |
| N$_t$ | 15.26 | 18.63 | 21.99 |
| Solution | W=50 | W=25 | |
| | Y=50 | X=25 | X=50 |
| | | Y=25 | |
| | | Z=25 | Z=50 |

This data were fed to an IBM 610 computer and under the exacting conditions first used the machine reported back to the operator that the information fed thereto on the analytical data needed more precise definition. For example, in test 1 the machine reported under the conditions of operation that if the material was in fact essentially a 50–50 mixture of monoammonium orthophosphate and triammonium pyrophosphate, then the value for water needed to be changed from 9.80 to 9.797, for $P_o$ the value of 30.85 needed to be similarly adjusted, for $P_{no}$ the value needed to be changed from 30.98 to 30.9825, and for $N_t$ the value needed to be changed from 15.26 to 15.2615. Similarly, in tests 2 and 3 the machine indicated to the operator that more precise accuracy of the analytical information was required. However, the results of this programming on the computer indicated that the general form for the solution of our product is valid and correct. Accordingly, the operator subsequently fed the same original analytical information to the computer and let it cycle through a series of numbers to come out with the best combination for the product, or in other words, the product was predicted through computation involving "iteration" i.e., the computer was programmed in a manner wherein it was first "told" the degree of analytical error and then allowed to solve the problems accordingly.

The purposes of these calculations are to show the fundamental relationship between the independently derived blocks of information in our tablized examples. Specifically the range of chemical compositions are related by the fundamental mathematical expression to the constituents established by X-ray diffraction. Thus, the range of composition pertaining to the nitrogen and phosphorus species clearly encompasses the salts contained as product constituents in the various combinations of W, X, Y, and Z.

The following Table III shows X-ray diffraction characteristics of a number of ammonium polyphosphates produced according to our invention, said ammonium polyphosphates being under conditions of equilibrium such that the gel-like phase has disappeared but which polyphosphates have not been exposed to atmospheric water for any prolonged period of time. It will be noted that as the degrees of ammoniation increases from 5.2 pounds of ammonia per unit of $P_2O_5$ up to about 9.5, the occurrence of the various species of the four which comprise the product of our invention changes as follows:

At the lower degrees of ammoniation, the material is predominantly monoammonium orthophosphate and triammonium pyrophosphate; at about half way between the limits of ammoniation, the material contains substantial portions of all four of the species, and at the upper limits of ammoniation the product contains predominantly diammonium orthophosphate and tetraammonium pyrophosphate. Thus, it can be seen that the product of our instant invention is basically selected from the group comprising monoammonium orthophosphate, diammonium orthophosphate, triammonium pyrophosphate, tetraammonium pyrophosphate, and mixtures thereof, and at different degrees of ammoniation the relative amounts of the individual species vary according to the theoretical matrix array disclosed as our theoretical mathematical bridge between the analytical data generally illustrated in the left hand portions of the tabulated data and the observed X-ray diffraction characterizations found in the right hand portions of our tabulated data.

TABLE III.—X-RAY DIFFRACTION CHARACTERIZATION OF TYPICAL EXPERIMENTAL AMMONIUM POLYPHOSPHATES UNDER CONDITIONS OF EQUILIBRIUM

| Product No. | Composition, percent | | Lb. $NH_3$/unit $P_2O_5$ | Crystalline phases [a] | | | |
|---|---|---|---|---|---|---|---|
| | $P_2O_5$ | | Total N | | NP | $N_2P$ | $N_2P_2$ | $N_4P_3$ |
| | Total | Ortho | | | | | | |
| 1 | 63.3 | 37.0 | 13.5 | 5.2 | XX | | XX | |
| 2 | 61.4 | 31.7 | 14.3 | 5.6 | XX | | XX | |
| 3 | 61.5 | 31.3 | 14.6 | 5.8 | XX | | XX | |
| 4 | 60.3 | 26.7 | 14.6 | 5.9 | XX | | XX | |
| 5 | 60.9 | 26.9 | 14.8 | 5.9 | XX | | XX | |
| 6 | 61.5 | 34.4 | 15.0 | 5.9 | XX | | XX | |
| 7 | 60.5 | 30.0 | 15.0 | 6.0 | XX | X | XX | |
| 8 | 61.0 | 26.6 | 15.4 | 6.1 | XX | | XX | |
| 9 | 61.3 | 34.6 | 15.4 | 6.1 | XX | X | XX | |
| 10 | 61.1 | 28.4 | 15.7 | 6.2 | XX | | XX | |
| 11 | 59.8 | 33.0 | 15.3 | 6.2 | XX | | XX | |
| 12 | 59.9 | 30.0 | 16.5 | 6.7 | XX | X | XX | |
| 13 | 60.0 | 27.0 | 16.7 | 6.8 | XX | | X | X |
| 14 | 61.0 | 23.3 | 17.1 | 6.8 | XX | X | XX | X |
| 15 | 59.9 | 29.3 | 17.2 | 7.0 | XX | X | XX | |
| 16 | 60.2 | 24.0 | 17.5 | 7.1 | XX | | XX | X |
| 17 [b] | 59.7 | 40.0 | 18.2 | 7.4 | XX | X | X | |
| 18 | 59.1 | 26.0 | 18.3 | 7.5 | XX | X | X | X |
| 19 [b] | 57.5 | 36.5 | 18.7 | 7.9 | X | XX | XX | |
| 20 [b] | 57.1 | 33.1 | 19.9 | 8.5 | | XX | XX | |
| 21 [b] | 55.8 | 31.3 | 21.4 | 9.3 | | XX | | XX |
| 22 | 55.1 | 32.9 | 21.5 | 9.5 | | XX | | XX |

[a] $NP=NH_4H_2PO_4$; $N_2P=(NH_4)_2HPO_4$; $N_3P_2=(NH_4)_3HP_2O_7$; $N_4P_2=(NH_4)_4P_2O_7$; (XX) indicates an abundant phase; (X) indicates a minor crystalline phase.
[b] Experimental products which had been subjected to further ammoniation; production dates of these materials refer to original products before further ammoniation.

While we have shown and described particular embodiments of our invention, modifications and variations thereof will occur to those skilled in the art. We wish it to be understood, therefore, that the appended claim is intended to cover such modifications and variations which are within the true scope and spirit of our invention.

What we claim as new and desire to secure by Letters Patent of the United States is:

A new composition of matter containing a total plant food content ($N+P_2O_5$) in the range from about 72 to 84 percent by weight, wherein the ratio $N:P_2O_5$ [where N is expressed as pounds ammonia and where $P_2O_5$ is one unit (unit of $P_2O_5=20$ pounds $P_2O_5$)] is in the range from about 5.2 to about 9.5, and consisting essentially of an equilibrium mixture of solid water-soluble salts of ammonium orthophosphates and ammonium pyrophosphates, said ammonium orthophosphates selected from the group consisting of monoammonium orthophosphate, diammonium orthophosphate, and mixtures thereof, and said ammonium pyrophosphates selected from the group consisting of triammonium pyrophosphates, tetraammonium pyrophosphate, and mixtures thereof, said new composition of matter further characteried by the fact that substantially all of said equilibrium mixture of said water-soluble salts ultimately results from a molten mass of ammonium polyphosphates, said molten mass in turn resulting from the ammoniation of superphosphoric acid under conditions of elevated temperature and pressure, said superphosphoric acid selected from the group consisting of electric-furnace type, wet-process type and mixtures thereof.

References Cited

UNITED STATES PATENTS 3,264,085  8/1966  Hignett et al.

DONALL H. SYLVESTER, *Primary Examiner.*

S. LEON BASHORE, *Examiner.*

T. D. KILEY, *Assistant Examiner.*

UNITED STATES PATENT OFFICE
CERTIFICATE OF CORRECTION

Patent No. 3,336,127

August 15, 1967

Travis P. Hignett et al.

It is hereby certified that error appears in the above numbered patent requiring correction and that the said Letters Patent should read as corrected below.

Columns 7 and 8, TABLE I, in the footnote, line 2 thereof, for "$(NH_4)HPO_4$," read -- $(NH_4)_2HPO_4$, --; column 7, line 30, for "yyrophosphate" read -- pyrophosphate --; columns 9 and 10, TABLE III, eighth column, sub-heading thereof, for "$N_2P_2$" read -- $N_3P_2$ --; same table, ninth column, sub-heading thereof, for "$N_4P_3$" read -- $N_4P_2$ --.

Signed and sealed this 25th day of June 1968.

(SEAL)

Attest:

Edward M. Fletcher, Jr.

Attesting Officer

EDWARD J. BRENNER

Commissioner of Patents